United States Patent Office 3,471,521
Patented Oct. 7, 1969

3,471,521
METHOD OF REDUCING DEPOSITION OF SOLIDS AND TARRY MATERIALS FROM A GASEOUS EFFLUENT IN THE OXIDATION OF AN ORGANIC HYDROCARBON TO PRODUCE PHTHALIC ANHYDRIDE
Thomas J. Junker, Pittsburgh, Pa., assignor, by mesne assignments, to United States Steel Corporation, a corporation of Delaware
No Drawing. Filed July 20, 1964, Ser. No. 383,908
Int. Cl. C07c 63/18, 63/02
U.S. Cl. 260—346.4        15 Claims

ABSTRACT OF THE DISCLOSURE

A method for producing phthalic anhydride by a vapor phase oxidation of an organic hydrocarbon including a recovery system for said phthalic anhydride wherein the deposition of solids and tarry materials from a gaseous effluent in the oxidation and phthalic anhydride recovery system is substantially reduced which includes altering the concentration and or volatility of one or more of the vapor components of the gaseous effluent by contacting the effluent with a heated fluid in amounts sufficient to raise the temperature of the effluent stream or dilute the effluent stream above the point of saturation with respect to the vaporous solids contained therein or by contacting said effluent with an adsorption medium for a sufficient time to selectively reduce the vapor concentration of one or more of the contained vaporous solids the required amount.

---

The present invention relates to a method of gas treating and more particularly to a method for treating effluent gases from certain units associated with the production of phthalic anhydride.

In the production of phthalic anhydride from the vapor phase oxidation of aromatic compounds such as xylene or polynuclear compounds such as naphthalene, anthracene, the homologues of these compounds and naphthoquinone, several problems are associated with effluent gases leaving certain units conventionally employed in the overall processing technique. Generally, conventional units associated with the production of phthalic anhydride in a vapor phase oxidation technique include a vaporizer, a reactor, a gas cooler, a condenser, a scrubber, and a demister together with appropriate conduits leading to and from each such unit. In the production of phthalic anhydride, for instance, from naphthalene, the polynuclear aromatic compound usually is vaporized with the aid of a gas such as air or an inert gas such as nitrogen or steam as a diluent or carrier gas. Usually the vaporization is carried out under conditions such that the resulting vapor-gas mixture is not combustible. For example, if air is used the ratio of naphthalene vapor to air is held on the rich side of the combustible range, usually above about 8 mol percent, commonly between ten and twenty mol percent naphthalene. Usually, substantially all of the naphthalene stream is vaporized, commonly 99 percent of the stream is vaporized. The vaporized portion usually contains vaporized impurities, originally in the liquid naphthalene feed. Some of these impurities generally are reactive and tend to polymerize easily to tarry or relatively non-volatile compounds.

The remaining unvaporized portion of the feed contains tarry substances which are the polymerized products of some of the reactive impurities in the original liquid feed.

The resulting vaporized stream is ordinarily slightly below equilibrium saturation with respect to the liquid naphthalene feed still remaining unvaporized; usually it is introduced into a separator such as a cyclone separator and bed of packed solids such as ceramic rings, steel rings, or other forms to separate the unvaporized portion.

From the separator the vaporized feed stream is mixed with a secondary air stream to give a mixture usually containing 0.8 to 1.5 mol percent naphthalene vapor, and enters the reactor.

In the reactor the naphthalene is oxidized in the vapor phase to provide hot reaction gases containing phthalic anhydride as the main condensible constituent. The gases, in addition, generally contain maleic anhydride, water, oxygen, nitrogen, carbon dioxide, quinones, phenols, aldehydes and other by-products.

From the reactor the gases are introduced generally into a primary cooling zone wherein they are cooled close to the dew point temperature of the contained phthalic anhydride, by intimate contact with a cooling surface such as a tubular cooler. Usually they are cooled to about 131–135° C., and their contained heat is utilized to generate steam in the tubular cooler.

From the primary cooler the gases are introduced, generally, into a final cooling zone wherein they are brought, preferably, into direct and intimate contact with a cooling medium which simultaneously cools the gas and causes precipitation or condensation of phthalic anhydride therefrom. Any conventional cooling zone can be utilized and may be, for instance, a cooling chamber or condenser in the form of a horizontal tube or vertical tower wherein the cooling medium can be amongst others a fine water spray. The phthalic anhydride agglomerates, in one instance, in flake form, settles out and can be collected at the bottom of the cooling chamber. Subsequently, the base of the cooling chamber can be heated by any suitable means to melt the flakes and the resulting liquid phthalic anhydride can be continuously or intermittently removed from the chamber. In accordance with usual practice, the gases which have been partly freed of the precipitated or condensed phthalic anhydride are passed into a centrifugal collector or cyclone, in which the remaining precipitated anhydride is separated. The gases leaving the cyclone are then conveyed to a scrub tower where maleic anhydride is removed in a conventional manner.

The above general procedure has several disadvantages which influence substantially the overall economics of the process and which, generally, are associated with the transportation or conveyance of gases between processing units.

Thus it has been found that undesirable tarry deposits occur in the separator following the feed vaporizer and in the conduits leading from the separator to the reactor. These deposits are especially undesirable in the conduit from the point of mixing with the secondary air to the point of entry into the reactor beacuse of their potentially pyrophoric nature. Experience shows that these deposits, after a period of standing, will ignite spontaneously in air at elevated temperatures and serve as a source for fire and ignition of the gases in this aforementioned conduit, the gases normally being in the combustible range. The combustion that follows usually is of sufficient violence that it may be classed as an explosion and requires extensive explosion venting to protect the conduit and connected equipment from damage.

The tarry deposition at this point in the processing procedure originates in part from unvaporized mist in the vaporized feed which settles on conduits and equipment and in part from vaporized reactive impurities in the vaporized feed. The tarry mist tends to settle on the equipment and lines, where it becomes gradually more viscous and tarry by virtue of continued polymerization of the contained reactive impurities and by gradual evaporation of the remaining liquid polynuclear aromatics. The vaporized reactive impurities tend to polymerize on the conduit and equipment surface and also form tarry deposits.

Because of the high labor cost and lost production time incidental to the tarry deposits, it becomes very desirable to avoid or minimize them. High efficiency separators such as small diameter multiple cyclones, packed beds, and fine-mesh wire demisters are helpful but suffer a disadvantage in that they rapidly become fouled with the tarry deposits and must frequently be cleaned by mechanical means or by flushing with a suitable solvent. Since the deposits become continually more insoluble as they stand, suitable solvents are difficult to find or are very expensive.

It is, therefore, one of the objects of the present invention to overcome the disadvantages of existing methods to substantially eliminate deposition of tarry materials from a vaporizer-separator effluent gas on the separator unit itself, on the conduit surface conveying the effluent from the unit, or in subsequent equipment into which the effluent is introduced.

It has also been found that undesirable solids deposition occurs in the primary cooling zone on the heat transfer surfaces. The deposition is in the form of a black tarry substance which gradually fouls the surface, causing an increase in flow resistance. In addition, the tarry deposit tends to deposit also in the conduit between the primary cooling zone and final cooling zone where it is both a fire hazard and a source of flow resistance.

The deposition at this point in the processing originates from the precipitation of the relatively non-volatile tarry vapors from the hot reaction gases as they cool in the primary cooling zone and in the conduit leading from the primary cooling zone. Because of its low vapor pressure, the tar vapor tends to precipitate at a higher temperature than the contained phthalic anhydride vapors although its concentration usually is less than one percent by weight of the contained phthalic anhydride vapor.

Heretofore it has been proposed to solve the undesirable accumulation or deposition of periodic flushing of the surfaces with suitable solvents and by strapping by means of turbines, drills, and other similar equipment.

These methods suffer serious disadvantages in that they are expensive and, furthermore, usually require the equipment to be taken from service during cleaning. Thus, usually, a paired primary cooling zone must be supplied to permit cleaning of the one while the other is in service.

It is therefore another object of the present invention to overcome the disadvantage of existing methods to substantially eliminate deposition of solid materials from the surfaces of the primary cooling zone and conduit leading from the primary cooling zone.

Similarly, it has been found that undesirable solids deposition occurs in the exit conduits leading from the final cooling chamber which amongst other things increases the resistance to gas flow. The effluent stream leaving the cooling chamber, generally, is at a temperature of about 45 to 75° C. and is essentially saturated with phthalic anhydride and maleic anhydride. Additionally, it can be saturated with or contain other vapors such as quinones, benzoic acid and aldehydes. It also contains a fine dust or mist of solid particles consisting of phthalic anhydride, maleic anhydride and other components.

The deposition at this point in the processing procedure originates in part from precipitation of the gases due to loss of heat from the gas stream to the conduit walls, in part from the mist and, if the cooling chamber operation is cyclic, in part from the operating cycle in which the cooling chamber is heated to melt the phthalic anhydride flakes. During this latter operation the conduit walls experience a deposition thereon by diffusion and thermal circulation from the hot cooling chamber.

The deposition initially can be anhydrous in form, i.e. the phthalic and maleic content of the deposit is in the anhydride form. However, during the condensing or cooling cycle of the cooling chamber, moisture from the effluent gas stream tends to be absorbed in the cooler deposits which in turn hydrolyzes the anhydrides. Further, during the heating cycle of the cooling chamber, moisture from gradual dehydration of small amounts of phthalic and maleic acids in the melting of crude phthalic anhydride is brought into the cooling chamber or condenser outlet conduits by thermal circulation or diffusion which also tends to be absorbed in the relatively cooler deposits thus hydrolyzing the anhydrides.

Heretofore, it has been proposed to solve this undesirable accumulation or deposition by periodic flushing with suitable solvents, removal of the mist in cyclones and heating the exit conduits directly. Flushing with solvents, while effective, suffers from serious disadvantages in that it requires, generally, an elaborate and expensive spray system to insure complete flushing. Removal of the mist by cyclones is only partially effective because of its small particle size. Thus, failure to completely or substantially remove the mist fails to remove one of the causes for the deposition. Direct heating of the exit conduits also has disadvantages in that it is expensive because of the generally large size of the exit lines and the difficulty in achieving uniform heating.

It is therefore another object of the present invention to overcome the disadvantages of existing methods to substantially eliminate deposition of solid materials from a cooling chamber effluent gas on a conduit surface conveying the effluent.

From the cooling chamber or condenser the gases are processed to remove additional phthalic anhydride and are subsequently conveyed to a scrub tower to remove, principally, maleic anhydride although other components can also be selectively removed as well. Heretofore, scrubber tail gases have been treated to separate mist and fume components to preclude or reduce substantially the occurrence of fires, explosions or other undesirable effects especially attendant with the use of, initially, contaminated feed stocks in the process and related, principally, to the mist and contaminant. Efforts to remove the mist have proved disadvantageous because if its solids deposition on the apparatus employed. Various means such as shallow beds of inert packing, centrifugal separators and wire mesh impingement separators containing more or less elaborate flushing systems to wash down the surface deposits as well as other conventional demisters have been employed.

Prior to introduction of a gas into a mist separator in existing methods, the gas from the phthalic anhydride cooling chamber or condenser described above is generally brought into intimate contact with an aqueous liquor by passing through circulating sprays or sparging through one or more aqueous liquor pools, where is cools nearly to its adiabatic saturation temperature and is scrubbed essentially free of soluble acid vapors such as phthalic and maleic anhydrides. Quinones, aldehydes, fumes and other similar components, however, are relatively more volatile and less soluble than the hydrolyzed anhydrides and are only partially removed. It is generally these remaining components in the scrubber effluent together with the contained mist, which produce undesirable deposits in subsequent processing apparatus.

Fume removal by low temperature incineration with the aid of catalysts has been practiced although the process is disadvantageous in the high fuel cost associated therewith. Fume removal by adsorption has also heretofore been found impractical because of the high usage of adsorbing agent as well as the fouling effect of mist and solids.

It is therefore another object of this invention to overcome the disadvantages of the prior art in treating an effluent gas stream from a phthalic anhydride processing unit to reduce substantially solids deposition therefrom on subsequent processing equipment and to substantially eliminate the mist and fume content thereof.

These and other objects and advantages of the invention will become more apparent to one skilled in the art as the description proceeds.

Broadly, the present invention provides a method for substantially reducing deposition of solids and tarry materials from a gaseous effluent in a system provided for the catalytic oxidation of an organic compound by selectively altering the concentration and/or volatility of one or more of the vapor components of the gaseous effluent by a combination of one or more methods.

The first method consists of contacting the said effluent with a heated fluid in amounts sufficient to raise the temperature of the effluent stream or dilute the effluent stream above the point of saturation with respect to the vaporous solids contained therein.

A second method consists of contacting the said effluent with an adsorption medium for a sufficient time to selectively reduce the vapor concentration of one or more of the contained vaporous solids the required amount.

Other methods will become apparent as the description of the invention proceeds.

In one embodiment the invention comprises altering the concentration or volatility of the polynuclear aromatic in the vaporized feed from the feed vaporizing zone so that the superheat in the final mixture with respect to liquid polynuclear aromatic remaining in the contained unvaporized mist is removed.

The desired alteration may be accomplished by injecting a liquid such as water or warm liquid naphthalene, or injecting a cold gas such as cold nitrogen or air. If liquid is used part or all of it may flash evaporate and thereby overcome the superheat. If a liquid other than water is used it preferably is a portion of the original naphthalene feed normally used to supply the vaporizer. If a large amount of liquid naphthalene is used, the unvaporized portion may be recycled if desired or may then be fed to the vaporizer.

Injection of water into effluent is the preferred method of removing the aforementioned superheat.

With the superheat removed, the effluent will not continue to evaporate the volatile portion of the tar mist and thereby destroy its fluidity. Therefor, the mist may be separated from the gaseous effluent in high-efficiency separators such as multiple cyclone separators, fine wire mesh impingement separators and electrostatic precipitators and will drain freely from the equipment walls and internals. The demisted gaseous effluent has a greatly reduced tendency to form tarry deposits on equipment and conduits.

Although it is preferable that all of the superheat be removed from the effluent before separating the tarry mist, some improvement is realized even if only a part of the superheat is removed.

After removal or substantially complete removal of the tarry mist and other contained liquid mist that may form during either of the aforementioned treatments, the demisted effluent advantageously may be made superheated with respect to the contained vapor either by heating or by adding a heated non-condensing gas such as air, nitrogen or superheated steam. If air is used care should be taken that the final mixture remains outside the combustible range. If superheated steam is used care must be taken not to add so much that a portion of the steam condenses.

The demisted superheated effluent may then advantageously be introduced into an adsorbent bed (for example, a bed of activated carbon) to remove a part of contained reactive impurities without rapidly fouling the bed by tarry deposition in the bed and equipment.

In yet another embodiment the invention comprises altering the relative concentration of tarry vapor to phthalic anhydride vapor in the effluent from a conventional reactor so that when the effluent is cooled to the dew point of the tarry vapor and the tarry vapor condenses, it will absorb some phthalic anhydride vapor and thereby remain fluid and drain freely. Preferably, the concentration of the tarry vapor is selectively reduced to a level that its dew point temperature is less than the temperature of the primary cooler effluent.

The desired alteration may be accomplished, preferably after first cooling the reactor effluent close to the dew point of the contained tarry vapor, by contacting the effluent with an adsorption medium, preferably activated carbon because of its reasonable cost and preferably sized about 4 x 8 mesh or larger to minimize its resistance to gas flow. The required length of adsorption bed and time of contact in the adsorption bed will depend on the desired reduction in tar level and effectiveness of the adsorbent and may be determined by trial.

The desired alteration may also be accomplished, preferably after first cooling the reactor effluent close to the dew point temperature of the tarry vapor, by contacting the efflulent with a heated fluid, preferably heated liquid phthalic anhydride, such that the dew point temperature of the final mixture with respect to phthalic anhydride is raised the desired amount.

Contacting the cooled reactor effluent with a bed of activated carbon is the preferred method of alteration of the concentration of the contained tarry vapor relative to the concentration of the contained phthalic anhydride vapor.

In another embodiment the invention comprises contacting the effluent from a phthalic anhydride cooling chamber or condenser with a heated fluid so that the final mixture of effluent and heated fluid is above the saturation point with respect to moisture, vaporous anhydrides and other vaporous solids contained therein. Preferably, the heated fluid is a heated gas such as air or steam or a mixture of nitrogen and steam or air and steam and is supplied in amounts sufficient to increase the effluent's temperature and/or in amounts sufficient to dilute the effluent to a level superheated with respect to the various contained vapors. The effluent at superheated level vaporizes surface deposits accumulated on the interior surface of the outlet conduit during the condensing cycle. The preferred fluid is steam.

In yet another embodiment of the invention an effluent from a conventional scrubber is contacted with a heated fluid also in amounts sufficient to raise the temperature of the stream above the point of saturation with respect to the contained vaporous solids. In this embodiment, preferably, the process comprises injecting hot water or, more advantageously, live steam into the scrubber effluent at a point, preferably, beyond contact with the bulk of the scrubbing liquor. Live steam is generally preferred because it simplifies proper maintenance of a water balance in the scrubber and its contact with the effluent should, advantageously, be controlled so as to be distributed over the entire cross section of the flowing effluent stream. Thereafter, the effluent can be introduced into a demister to remove the contained mist. As noted hereinabove, introduction of a scrubber effluent into a conventional demister results in the formation of undesirable deposits in the demister, thus seriously minimizing its efficient operation. However, in the method of the instant invention the heat and moisture provided by the injection of a heated fluid, such as hot water or steam, raises the effluent to its water saturation point, thus preventing evaporation of the mist and at the same time heats the effluent to prevent precipitation of the vaporous quinones and other solids.

The steam or hot water should be added to saturate and raise the temperature of the entire cross-section of the flowing effluent, preferably, about 1 to 20 centigrade (2–35 Fahrenheit) degrees. Distributing the injected heated fluid over the full cross-section of the effluent insures uniform saturation, thorough heating of all portions of the effluent and avoids local overheating which is undesirable because it promotes the polymerization to a non-volatile, insoluble form of the organic solids dissolved or suspended in the mist or on the surfaces of the apparatus.

Preferably, the heated fluid is contacted with the effluent at a point substantially removed from the scrubbing liquor to avoid revaporization of vaporous solids such as quinones which are condensed in the scrubbing liquor and which would be introduced into the demister and partially deposited on the surface thereof or increase fume nuisance.

As an alternative to contacting the scrubber effluent with a heated fluid by injecting therein hot water or live steam, it has been found that advantageous results of the present invention can also be achieved by adding to the effluent steam, in combination, heat and a diluent in amounts sufficient to convert the contained mist to a vapor, to convert its hydrolyzed acid components to the more volatile anhydride form and to vaporize and bring the resulting mixture to a point superheated with respect to all of the contained vapors. Generally, any means of adding heat to the effluent can be employed. For instance, such methods as heating the steam directly by convention, conduction or radiation means or by heating the diluent before addition thereto can be utilized. Preferably, the diluent is superheated steam which affords the added advantage of maintaining an efficient, low-cost operation.

In the practice of the alternative procedure it has been found that the relatively non-volatile phthalic and maleic acid components of the mist fraction of the effluent are converted to the more volatile anhydride form at temperatures far below their normal dehydration temperatures. Thus, the invention eliminates, at a relative low cost, premature fouling and impairment of processing equipment which result from accumulation of liquid and unvaporized solids in such apparatus, especially adsorbing beds which advantageously can be employed in processing techniques subsequent to a scrubbing operation.

When it is desired to remove residual fumes from the scrubber effluent subsequent to the preferred or alternative procedures described above, the thus treated effluent can be contacted with a suitable adsorbent. In order to prevent condensation of moisture in the adsorbent it is preferable that the bed is heated and the effluent is mixed with an inert diluent such as air, nitrogen or carbon dioxide. Any adsorbent capable of removing the fume components can be employed. Preferably, the adsorbent is activated carbon in discrete particulate form because of its affinity for the fume components and its relatively low cost. The size of the activated carbon particles can vary widely, but it is preferred that the particles be larger than 4 x 8 mesh to avoid high resistance to the effluent flow. When the adsorbent is exausted, it can be regenerated by any conventional method such as stripping with live steam and thereafter recycled for further use.

The recovered fume components which are chiefly quinones and aldehydes can be processed for commercial disposition or if their recovery is not desired they can be eliminated from the treated effluent by conventional means such as incineration, chemical treatment or the like.

The following examples will serve to illustrate this invention:

EXAMPLE I

About one c.f.m. of gas from the reactor effluent cooled to about 220° C. was passed through a ¾" pipe electrically heated and insulated to maintain temperature of the gas approximately unchanged. From the pipe the gas was introduced into an eight-inch long length of glass tubing about ¼" in diameter, used as an air cooled condenser. Tar droplets condensed on the wall of the glass tube at a temperature of approximately 145–155° C. Nearly water-white droplets of phthalic anhydride condensed in the bottom few inches of the tube.

EXAMPLE II

Using the same apparatus described in Example I, the ¾" tube was packed with 4 x 10 mesh activated carbon, held in place by stainless steel gauze wire. As in the first example, about one c.f.m. of partially cooled reactor effluent was introduced into the apparatus.

For the first 1¾ hours of operation no phthalic anhydried vapor was perceptible in the gaseous effluent. After this initial period, however, phthalic anhydride appeared in the effluent and continued to flow through the bed until the test was terminated and appeared as nearly water-white droplets near the outlet of the glass tube.

Total test time was 3½ hours. No tar condensed on the glass wall during the test period.

EXAMPLE III

About one c.f.m. of phthalic anhydride condenser effluent was passed through an unheated ¾ inch pipe, 8 inches long. The temperature of the gas was 145–150° F. at the pipe inlet and dropped several degrees F. in passing through the pipe. After about 24 hours the pipe was found to contain a heavy coating of solids on its inner wall which was analyzed and found to contain 14.8% maleic acid, 6.9% maleic anhydride, 10.5% phthalic acid, 33.5% phthalic anhydride and 12.4% naphthoquinone.

EXAMPLE IV

Steam at a temperature of about 200° F. was added to the effluent of Example III in amounts sufficient to raise the effluent temperature to 180° F. Within an hour, substantially all deposition on the pipe wall had disappeared.

The flow of condenser effluent mixed with the steam was continued for approximately four more hours. Inspection revealed no further deposition had occurred.

EXAMPLE V

A deposit was again permitted to form on a ¾ inch pipe in essentially the same manner as described in Example III. Thereafter steam at a temperature of 400° F. was added to the effluent gas entering the pipe from a condenser in amounts sufficient to raise the effluent gas temperature about 10 to 20 degrees F. The flow of the mixture was continued for three hours at which time inspection revealed that the amount of the deposit on the pipe inner wall was substantially reduced.

EXAMPLE VI

Ten thousand cubic feet per minute of scrubber effluent of 30° C., nearly saturated with water vapor and containing vaporous components such as aldehydes and quinones, and a mist of aqueous liquor containing some maleic acid, phthalic acid and other organic components was passed through a wire mesh demister about 7 feet in diameter and 6 inches deep. Three to 3.5 gallons per minute of hot water at a temperature of about 150° F. was sprayed up against the underside of the demister through a manifold of 8 spray nozzles. The demister remained free of blockage for two weeks as evidenced by a low flow resistance of 0.1–0.2 inches of water. The water spray was then reduced in volume to 2.5–2.8 gallons per minute, and the demister became blocked in a period of 24 hours as evidenced by an increase in measured flow resistance to 3–4 inches of water. A portion of the wet cake blocking the demister analyzed 50% as $\alpha$-naphthoquinone and 10% maleic acid.

EXAMPLE VII

Seventy c.f.m. of unheated scrubber effluent gas described in Example VI was passed through a wire mesh demister 6 inches in diameter, held in a glass column 6 inches in diameter and 5 feet in height. The glass column was insulated to provide a nearly adiabatic system. Sufficient live steam was added to the gas entering the column to bring the temperature of the final mix 6–17° C. above the initial temperature of the scrubber effluent gas. No deposition of solids occurred during 228 hours of operation.

The steam supply was then shut off and the demister plugged badly with solids after 18 hours of operation.

EXAMPLE VIII

Seventy c.f.m. of scrubber effluent gas described in Example VI was passed through the 6-inch column and demister described in Example IV. Just ahead of its entry into the column, the gas was preheated 3–7° C. After 3 hours, the demister was removed. It was badly blocked with dry solids analyzing 30% α-naphthoquinone, 70% phthalic anhydride and 1% maleic anhydride. The solids were free or nearly free of hydrolyzed acids such as phthalic acid or maleic acid.

EXAMPLE IX

To about 10,000 c.f.m. of scrubber effluent gas described in Example VI, steam was added at a point where the steam contacted a large proportion of spray from the scrubber liquor. The amount of steam added was sufficient to raise the temperature of the scrubbed gas 6–9° C. A 70 cubic foot per minute portion of the heated gas was then passed through the 6-inch demister and column described in Example VII. In a period of 24 hours, the deposits of yellow crystals, characteristic of α-naphthoquinone, were found dispersed through the demister.

EXAMPLE X

Seventy c.f.m. of unheated scrubber effluent gas described in Example VI was passed through a wire mesh demister 6 inches in diameter, held in a glass column 6 inches in diameter and 5 feet in height. The glass column was insulated to provide a nearly adiabatic system. Sufficient live steam was added to the gas entering the column to bring the temperature of the final mix 6 to 17° C. above the initial temperature of the scrubber effluent gas. No deposition of solids occurred during 22 hours of operation.

From the demister the effluent containing a fume whose chief components were quinones and aldehydes was contacted with an insulated adsorbent bed of activated carbon having a particle size of 4 x 8 mesh and heated to a temperature of about 50° C. The flow rate through the adsorbent bed of the effluent diluted with nitrogen was about 80 c.f.m. The quinones and aldehydes were subsequently recovered by stripping activated carbon with live steam. The regenearted activated carbon was recycled for further use in removing fume components.

What is claimed is:

1. In a method of producing phthalic anhydride by a vapor phase oxidation of an organic hydrocarbon selected from the class connisting of xylene, naphthalene, anthracene and naphthoquinone wherein a gaseous phthalic anhydride containing effluent resulting from said oxidation is condensed to remove a substantial portion of said phthalic anhydride and wherein a second gaseous effluent comprising a mixture of vaporous solids, vaporous maleic anhydride and residual vaporous phthalic anhydride resulting from said condensing is conducted to a zone for separation of the maleic anhydride and phthalic anhydride values therefrom, the improvement comprising admixing with said second gaseous effluent prior to said separation a heated fluid in amounts sufficient to raise the temperature of said second gaseous effluent 2 to 35 degrees F.

2. The method of claim 1 wherein the heated fluid is selected from the class consisting of air and steam.

3. In a method of producing phthalic anhydride by a vapor phase oxidation of an organic hydrocarbon selected from the class consisting of xylene, naphthalene, anthracene and naphthoquinone wherein a gaseous phthalic anhydride containing effluent resulting from said oxidation is condensed to remove a substantial portion of said phthalic anhydride and wherein a second gaseous effluent comprising a mixture of vaporous solid, vaporous maleic anhydride and residual vaporous phthalic anhydride resulting from said condensing is conducted to a zone for separation of additional phthalic anhydride and subsequently to a scrubber for removal of maleic anhydride and wherein a scrubber tail gas containing mist and fume components is conducted to a demister, the improvement comprising injecting a heated fluid into said scrubber tail gas at a point beyond substantial contact with the scrubbing media, said heated fluid being present in an amount sufficient to raise the temperature of said scrubber tail gas 2 to 35 degrees F. and removing said mist from said scrubber tail gas.

4. The method of claim 3 wherein said heated fluid is selected from the class consisting of water and steam.

5. The method of claim 3 which includes adsorbing said fumes on an adsorbent material and recovering said fumes.

6. The method of claim 5 wherein said adsorbent material is activated carbon.

7. In a method of producing phthalic anhydride by a vapor phase oxidation of an organic hydrocarbon selected from the class consisting of xylene, naphthalene, anthracene and naphthoquinone wherein a gaseous phthalic anhydride containing effluent resulting from said oxidation is condensed to remove a substantial portion of said phthalic anhydride and wherein a second gaseous effluent comprising a mixture of vaporous solids, vaporous maleic anhydride and residual vaporous phthalic anhydride resulting from said condensing is conducted to a zone for separation of additional phthalic anhydride and subsequently to a scrubber for removal of maleic anhydride and wherein a scrubber tail gas comprising hydrolyzed acid components and fume components is treated to separate the components of the scrubber tail gas, the improvement comprising, in combination, heating and diluting said scrubber tail gas prior to treatment to separate the components thereof sufficiently to convert the hydrolyzed acid components to the anhydride form to vaporize and to superheat the diluted scrubber tail gas with respect to the vapors contained therein.

8. The method of claim 7 wherein the effluent in diluted with superheated steam.

9. The method of claim 7 which includes adsorbing said fumes on activated carbon and recovering said fumes.

10. In a method of producing phthalic anhydride by a vapor phase oxidation of a liquid organic hydrocarbon feed stream selected from the class consisting of xylene, naphthalene, anthracene and naphthoquinone, said feed stream containing reactive contaminants wherein said feed stream is vaporized in a carrier gas and wherein the resulting vaporized stream includes the reactive contaminants in mist and vapor form, the improvement comprising contacting said vaporized stream with a heated fluid in amounts sufficient so that the partial pressure of vapor in the vaporized feed stream is above the point of saturation with respect to the vapor pressure of said mist contained in said vaporized stream, removing said mist, heating the vaporized stream to superheat the same with respect to its contained vapors, absorbing said reactive contaminants in vapor form on an adsorbent material and thereafter oxidizing the substantially reactive contaminant free vaporized feed stream.

11. The method of claim 10 wherein the adsorbent material is activated carbon.

12. The method of claim 10 wherein the heated fluid is the same as the liquid organic hydrocarbon feed stream.

13. In a method of producing phthalic anhydride by a vapor phase oxidation of a liquid organic hydrocarbon feed stream selected from the class consisting of xylene, naphthalene, anthracene and naphthoquinone, said feed stream containing reactive contaminants wherein said feed stream is vaporized in a carrier gas and wherein the resulting vaporized stream includes the reactive contaminants in mist and vapor form, the improvement comprising cooling said vaporized stream sufficiently to lower the temperature below the point of saturation with respect to the vapor pressure of the mist contained in said vaporized stream, removing said mist and thereafter oxidizing the demisted vaporized stream.

14. The method of claim 13 which includes superheating said demisted vaporized stream and contacting said superheated stream with an adsorbent material to remove reactive components in vapor form prior to oxidizing said demisted vaporized stream.

15. The method of claim 14 wherein the adsorbent material is activated carbon.

References Cited

UNITED STATES PATENTS

| | | | |
|---|---|---|---|
| 2,220,044 | 9/1940 | Jaeger | 260—346.8 |
| 2,149,362 | 3/1939 | Riegler | 260—346.4 |
| 3,024,171 | 3/1962 | Bone | 203—7 |
| 3,138,440 | 6/1964 | Weittenhiller et. al. | 55—80 |
| 3,183,645 | 5/1965 | Teller | 55—76 |

OTHER REFERENCES

John H. Perry, Chemical Engineers' Handbook, New York, McGraw-Hill (1963) Chapter 16, p. 19.

ALEX MAZEL, Primary Examiner

BERNARD I. DENTZ, Assistant Examiner

U.S. Cl. X.R.

260—346.7, 346.8